US009284986B2

(12) United States Patent
Jääskeläinen et al.

(10) Patent No.: US 9,284,986 B2
(45) Date of Patent: Mar. 15, 2016

(54) BEARING ARRANGEMENT IN AN ACTUATOR OF A FOREST MACHINE

(71) Applicant: Waratah OM Oy, Joensuu (FI)

(72) Inventors: Esa Jääskeläinen, Lehmo (FI); Juho Keskinen, Tampere (FI); Kari Hanne, Kangasala (FI); Toni Jormanainen, Ylämylly (FI); Juha Nevalainen, Käsämä (FI); Antti Hirvonen, Lehmo (FI)

(73) Assignee: Waratah OM OY, Tampere (FI)

( * ) Notice: Subject to any disclaimer, the term of this patent is extended or adjusted under 35 U.S.C. 154(b) by 3 days.

(21) Appl. No.: 14/247,696

(22) Filed: Apr. 8, 2014

(65) Prior Publication Data
US 2014/0314357 A1 Oct. 23, 2014

(30) Foreign Application Priority Data
Apr. 17, 2013 (FI) .................................. 20135375

(51) Int. Cl.
*F16C 33/02* (2006.01)
*F16C 33/10* (2006.01)
(Continued)

(52) U.S. Cl.
CPC .............. *F16C 35/02* (2013.01); *A01G 23/083* (2013.01); *F16C 33/08* (2013.01); *F16C 43/02* (2013.01); *F16C 2202/04* (2013.01); *Y10T 29/4973* (2015.01)

(58) Field of Classification Search
CPC ... A01G 23/08; A01G 23/081; A01G 23/083; A01G 23/085; A01G 23/087; A01G 23/089; A01G 23/09; A01G 23/091; A01G 23/093; A01G 23/095; F16C 17/10; F16C 33/1055

USPC .......... 144/4.1, 34.1; 384/295, 296, 440, 441, 384/460, 368, 397, 398, 400, 401, 403
See application file for complete search history.

(56) References Cited

U.S. PATENT DOCUMENTS 3,627,002 A 12/1971 Fulghum, Jr.
4,417,759 A 11/1983 Pierrot, III et al.
(Continued)

FOREIGN PATENT DOCUMENTS

WO 0221906 A1 3/2002
WO 2007064275 A1 6/2007

OTHER PUBLICATIONS

First Examination Report issued in counterpart New Zealand application No. 623401, dated Apr. 24, 2014 (3 pages).
(Continued)

Primary Examiner — Phillip A Johnson

(57) ABSTRACT

A bearing arrangement in an actuator of a forest machine comprising a frame of the actuator, which frame defines a first opening. The bearing arrangement also comprises a bushing, at least part of the bushing arranged in the first opening, the bushing defining a second opening, at least part of an axle and/or a bearing being arranged in the second opening, the axle or bearing being arranged stationary or movable in relation to the bushing, and the bushing being removable from the frame of the actuator. Further, a method for maintaining an actuator of a forest machine, the actuator comprising a bearing arrangement of the described type. In the method, a second, corresponding bushing is provided, which is fitted for said first opening; said bushing is removed from the frame of the actuator, wherein said first opening is exposed; and said second bushing is installed in said first opening.

18 Claims, 9 Drawing Sheets

(51) Int. Cl.
*F16C 35/02* (2006.01)
*A01G 23/083* (2006.01)
*F16C 33/08* (2006.01)
*F16C 43/02* (2006.01)

(56) References Cited

U.S. PATENT DOCUMENTS

| | | |
|---|---|---|
| 5,486,085 A | 1/1996 | Gagne et al. |
| 2002/0081046 A1 | 6/2002 | Hamaguchi et al. |
| 2006/0086685 A1 | 4/2006 | Harr |
| 2008/0178963 A1* | 7/2008 | Swinyard ............ A01G 23/083 144/4.1 |
| 2008/0238116 A1 | 10/2008 | Stamey et al. |
| 2010/0313999 A1 | 12/2010 | Smythe |
| 2010/0314000 A1 | 12/2010 | Smythe et al. |

OTHER PUBLICATIONS

Office Action and Search Report Issued in Counterpart Finnish Application No. 20135375 with English translation, dated Feb. 13, 2014 (16 pages).

Extended Search Report issued in counterpart European application No. 14397513.4, dated Aug. 22, 2014 (10 pages).

* cited by examiner

BEARING ARRANGEMENT IN AN ACTUATOR OF A FOREST MACHINE

FIELD OF THE DISCLOSURE

The invention relates to bearings. The invention relates to bearings of work equipment. In particular, the invention relates to bearings in actuators of work equipment, such as forest machines.

BACKGROUND

Various bearings are used in machines. By means of a bearing, a machine part, such as an axle and/or a tool, is arranged to rotate or swivel with respect to another part of the machine, such as the body. In long-term use, the bearings and the body of the machine are worn. Particularly in work equipment, bearings are subject to relatively strong forces, whereby the wear of the bearings and the body is intense compared with some other uses, in which the effective forces are weaker. Due to the wear of the bearings, the machine has to be maintained at times. In solutions of prior art, clearance caused by wear of the body of the machine is difficult to correct, if it can be corrected at all.

SUMMARY

In this description, a bearing solution will be presented for, or in, an actuator of a forest machine, whereby the maintenance of the machine is facilitated to a significant extent. Furthermore, the maintenance interval is increased, thanks to the material choices and/or lubrication and/or shielding. Furthermore, the requirements on the quality and/or precision and/or alignment precision of the machining of the actuator at the manufacturing stage are decreased, whereby the manufacture will be faster and less expensive.

In an embodiment, the bearing arrangement in an actuator of a forest machine comprises
  a frame for the actuator of the forest machine, defining a first opening,
  a bushing, at least part of which is arranged in the first opening,
  the bushing defining a second opening, in which at least part of an axle and/or a bearing is arranged, which axle or bearing is arranged stationary or movable in relation to the bushing, and
  the bushing being removable from the frame of the actuator of the forest machine.

Furthermore, a method is presented for maintaining an actuator of a forest machine. In an embodiment of the method, the actuator of the forest machine to be maintained comprises
  a frame of the actuator of the forest machine, which defines a first opening, and
  a bushing, at least part of which is arranged in the first opening,
  the bushing defining a second opening, in which at least part of an axle and/or a bearing is arranged, which axle or bearing is arranged stationary or movable in relation to the bushing. In the method,
  a second, corresponding bushing is arranged available, which bushing is fitted for said first opening,
  said bushing is removed from the frame of the actuator of the forest machine, wherein said first opening is exposed, and
  said second bushing is installed in said first opening.

BRIEF DESCRIPTION OF THE DRAWINGS

In the following, the invention will be described in more detail with reference to the appended drawings, in which:

In FIGS. 1a to 5b, corresponding numbers or symbols are used for corresponding parts.

DETAILED DESCRIPTION

Figure 1A:
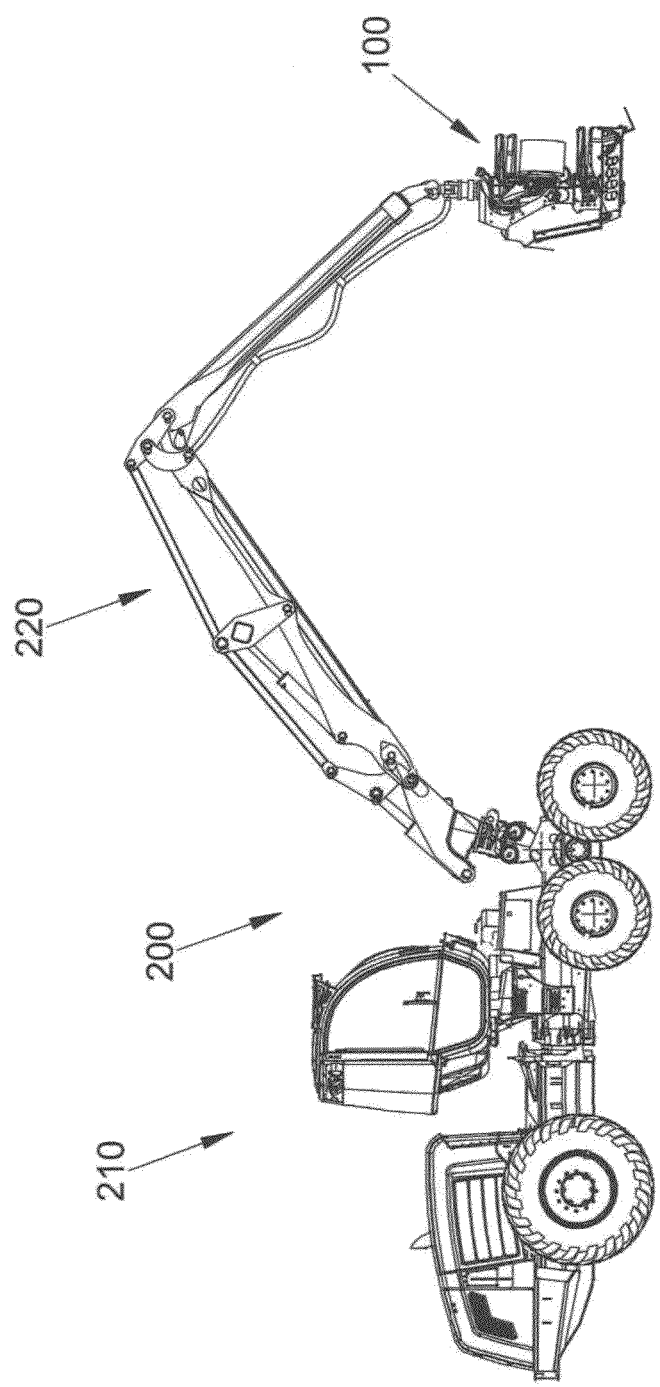
FIG. 1a shows a forest machine.

FIG. 1a shows a forest machine 200. The forest machine 200 comprises a base machine 210. The forest machine 200 also comprises a traverser and a crane 220 mounted on the traverser. The crane 220 comprises booms, for example a hoist boom, a stick boom, and an extension boom. A rotating device, i.e. a rotator, is provided at the head of the crane 220. Furthermore, a tilting device, i.e. a tilter, is provided at the head of the crane. An actuator 100 is provided at the head of the crane, for example connected to the rotator and/or the tilter. The work equipment 200 of FIG. 1 is of the forest machine type, more precisely a harvester, for felling, delimbing and cross-cutting trees in a forest into logs of desired length. In the work equipment 200 shown in the figure, the actuator 100 is a harvester head. The harvester can be used for implementing the harvesting steps from felling to stacking. Another commonly used forest machine is a forwarder (not shown in the figure), which refers to a forest machine designed for transporting timber. Harvesters are also known which can be used for harvesting timber in a forest as well as for transporting the timber away from the forest. Such a harvester can also be called a combined machine, because properties of a harvester and a forwarder are combined in it.

Figure 1B:
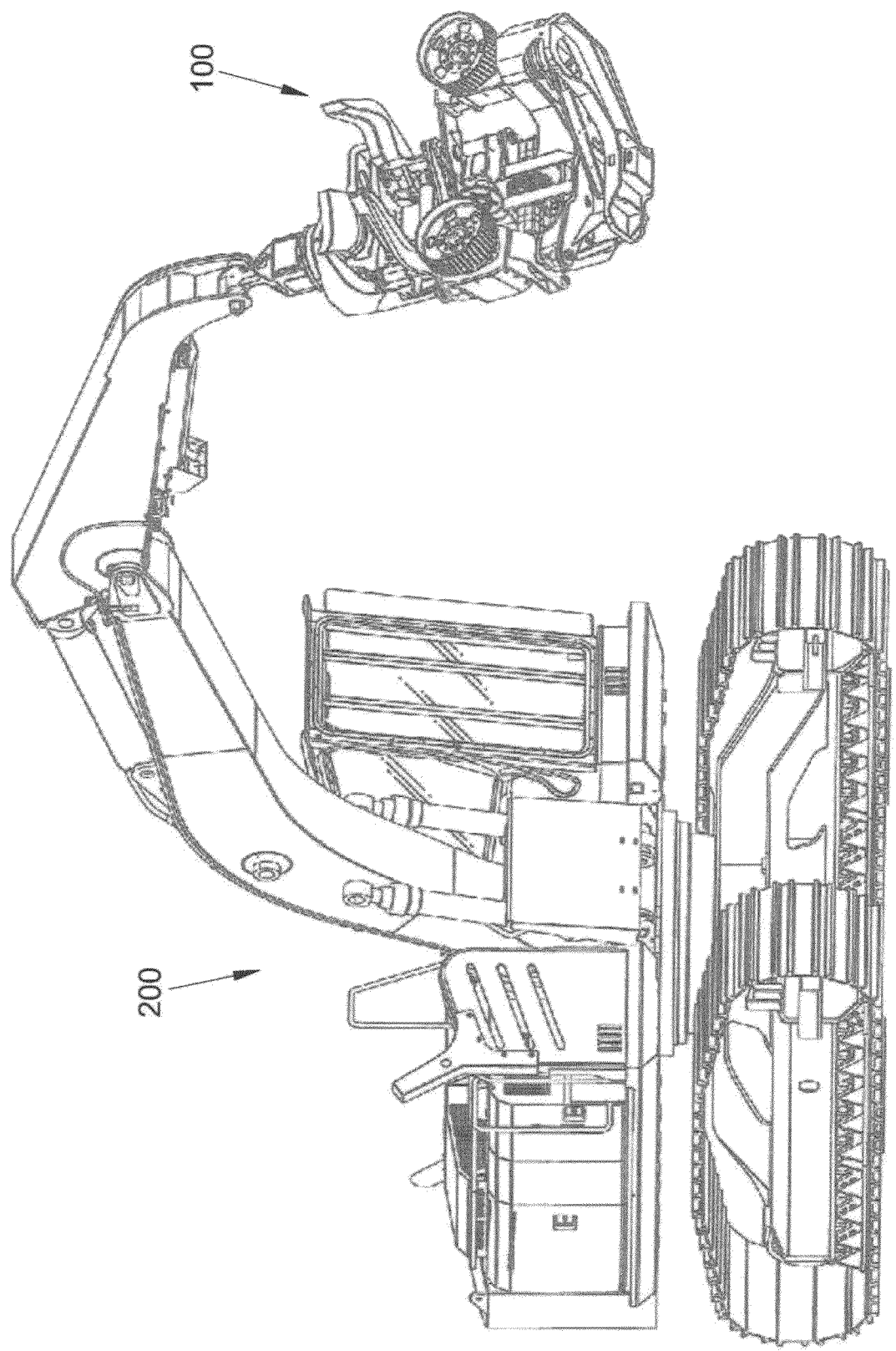
FIG. 1b shows another forest machine.

FIG. 1b shows another forest machine 200. The forest machine 200 of FIG. 1b is an excavator which can be used not only for excavating but also, for example, for hoisting stumps.

Figure 1C:
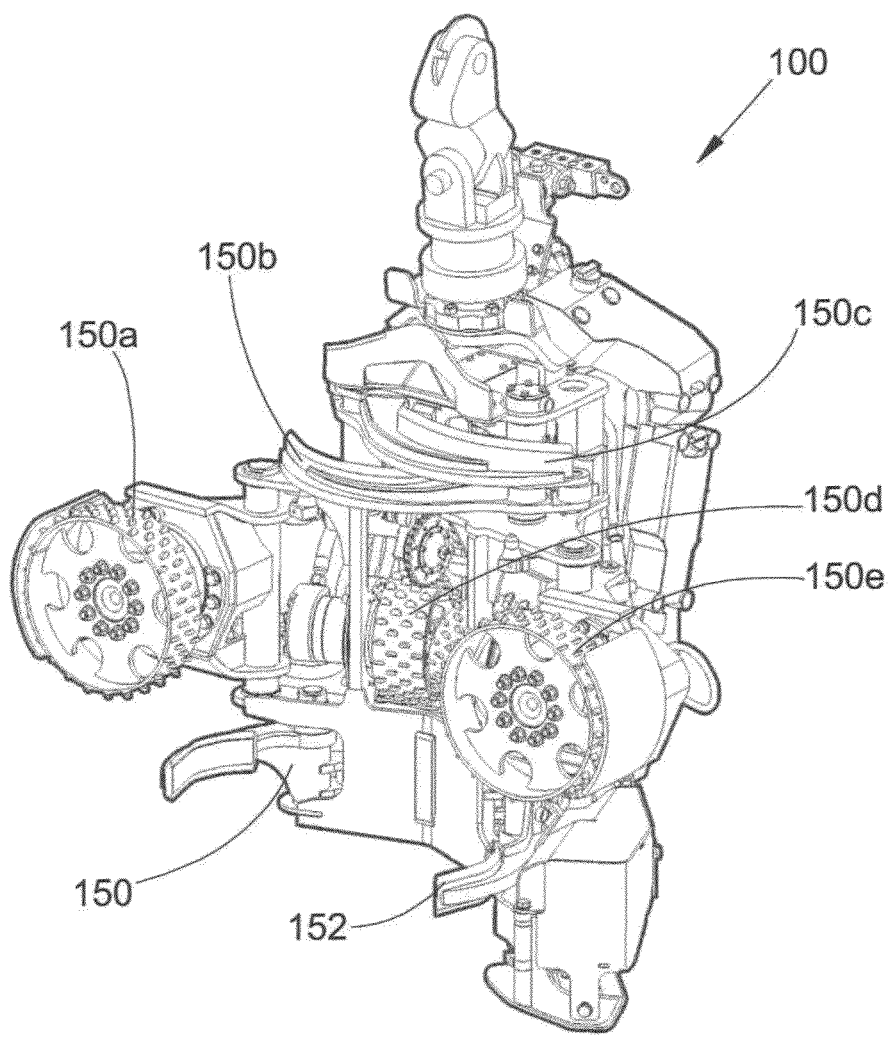
FIG. 1c shows an actuator in a forest machine.

FIG. 1c shows an actuator 100 of a forest machine in more detail. The actuator 100 comprises various tools 150, 150a-150e. Typically, such tools comprise a part that can be swivelled or rotated with respect to the frame of the actuator, whereby the arrangement comprises, in a corresponding way, at least a bearing and in many cases also an axle. Reference numeral 152 indicates the blade of a tool. In addition or alternatively, the actuator 100 can also be called an actuator arrangement or an actuator assembly.

The actuator 100 of the forest machine 200 typically comprises parts configured to be swivelled with respect to each other, such as the frame 110 of the actuator and the axle 130 of the tool, or the tool 150 and its axle 130. The swivelling of the parts with respect to each other is implemented by means of a bearing 140 or bearings.

In the use of the actuator of the forest machine, it is typical that said swivelling is slow and/or the swivel angles are relatively small. For example, in some cases the swivel angle can be not larger than 360 degrees, in some cases not larger than 180 degrees, and in some cases not larger than 90 degrees. For example, for swivelling the blade of a saw, it may be sufficient to swivel the blade about 90 degrees. Furthermore, the swivelling of the parts of a tool is typically relatively slow, for example not more than 60 rotations per minute (60 rpm), not more than 30 rpm, or not more than 10 rpm. Moreover, the actuator should preferably be compact and light-weight within permissible strength limits. For these reasons, the bearing solution for the present actuator is advantageously a sliding bearing solution, although in principle it would be possible to apply rolling bearings as well.

The bearings in an actuator of a forest machine are wherein they are subjected to great forces when used. As a result, the bearings and the parts in contact with them are subjected to significant wear. Therefore, the actuator has to be maintained at times. The bearing is typically replaceable. However, in addition to the bearing, the frame of the actuator may be subjected to wear when the actuator is in use. Installing a new bearing in the worn-out frame of the actuator will not repair the actuator, because the worn-out frame will be too loose for the new bearing. As a repair operation, replacing the frame of the actuator corresponds to the replacement of the whole actuator, in terms of difficulty.

By means of the solution to be presented, the operations for maintaining the actuator become significantly simpler. In addition, the solution to be presented allows a larger variety of materials for the actuator. For example, the frame of the actuator may be made of weldable steel, but the bushing may be made of a steel grade that is more resistant to wear. Furthermore, the solution to be presented provides a greater alignment tolerance for the opening of the frame of the actuator, as will be presented in more detail hereinbelow. Moreover, the solution to be presented provides a lower quality requirement for the machining of the frame of the actuator, as will be presented in more detail hereinbelow. Consequently, the solution to be presented not only makes the maintenance easier but also increases the service life and reduces the manufacturing costs.

Figure 2A:
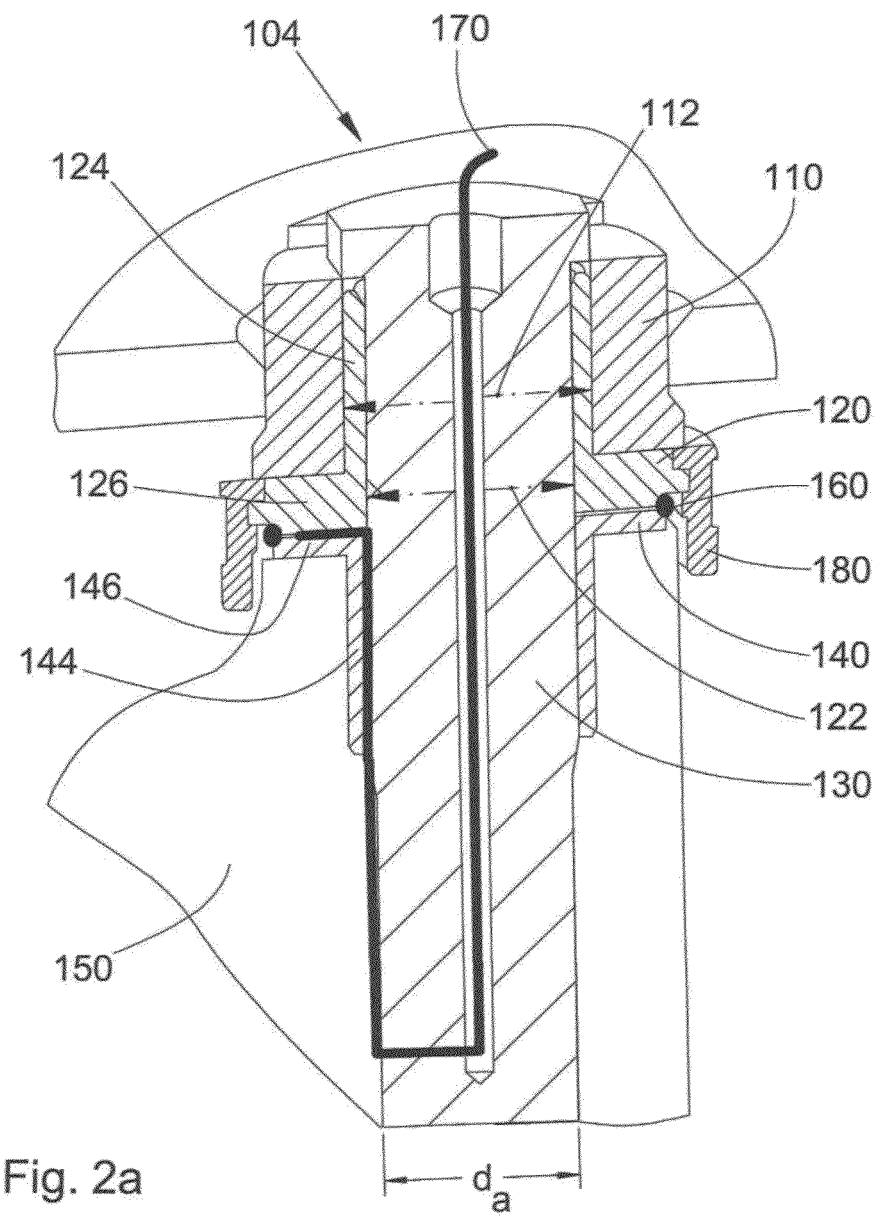
FIG. 2a shows a bearing arrangement in a side view.
Figure 2B:
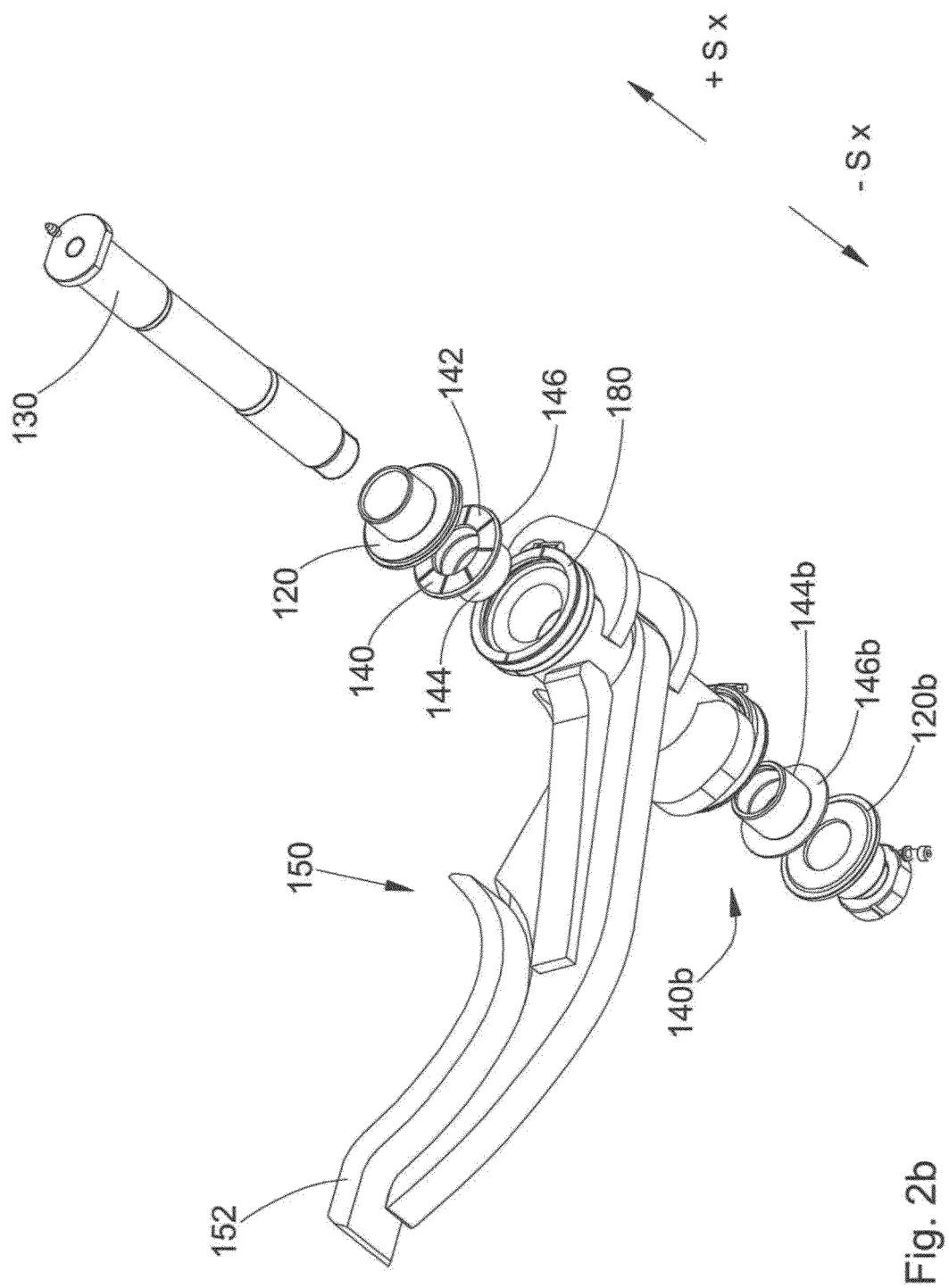
FIG. 2b shows a bearing arrangement in an actuator according to FIG. 1c in an exploded and perspective view.

FIGS. 2a and 2b show a bearing arrangement 104 in an actuator 100 of a forest machine 200. With reference to the FIGS. 2a and 2b, the bearing arrangement 104 comprises
- a frame 110 of the actuator 100 of the forest machine, delimiting a first opening 112, and
- a bushing 120, at least part of which is arranged in the first opening 112.

The bushing 120 delimits a second opening 122 in which at least part of an axle 130 and/or at least part of a bearing 140 is arranged. If at least part of the axle 130 is arranged in the second opening 122, as shown in FIG. 2a, the axle 130 is arranged stationary or movable, such as swivellable or rotatable, with respect to the bushing 120. If at least part of the bearing 140 is arranged in the second opening 122, as shown in e.g. FIG. 3b, the bearing 140 is arranged stationary or movable, such as swivellable or rotatable, with respect to the bushing 120. In addition, the bushing 120 is removable from the frame 110 of the actuator of the forest machine.

Consequently, the bushing 120 is replaceable. In this context, the term "axle" refers to a solid or hollow shaft which can be used for supporting pieces to each other, which pieces are swivellable or rotatable with respect to each other.

The bushing 120 can be installed in the first opening 112 of the frame 110 of the actuator, for example, by inserting, pressing and/or lightly knocking. The bushing 120 is fitted in the frame 110 of the actuator in such a way that the bushing 120 does not rotate with respect to the frame 110 in the normal use of the actuator. Thus, the outer dimension of the cross-section of the bushing 120, particularly the frame 124 of the bushing, is slightly larger than the cross-section of the first opening 112 of the frame 110. The cross-section of the first opening 112 can be circular or have another shape. However, it is simpler to machine a circular opening than an opening with a different shape in the frame 110. As described above, the bushing 120 is fitted in the first opening. Thus, the shape of the bushing 120 corresponds to the shape of the first opening.

In addition, the arrangement comprises at least one of the following: an axle 130 and a bearing 140. In the bearing arrangement 104 of FIG. 2a, the axle 130 is fixed with respect to the bushing 120 in such a way that the axle 130 does not rotate with respect to the bushing 120 in the normal use of the actuator. As will be presented in connection with FIG. 3a hereinbelow, in another embodiment the axle 130 is arranged rotatable with respect to the bushing 120. If the axle 130 and the bearing 140 are integrated, they can be considered to constitute a single unit which could be called an axle or a bearing. As will be presented in connection with FIG. 3b hereinbelow, in an embodiment the bearing 140 is arranged rotatable with respect to the bushing 120, and a tool 150 is fastened to the bearing 140 without a separate axle 130. In this case, the frame 144 of the bearing 140 constitutes the axle needed.

In FIG. 2a, part of the axle 130 is arranged in the opening 122 of the bushing 120, i.e. in said second opening 122. As will be presented hereinbelow, in an embodiment at least part of the bearing can also be arranged in the second opening 122. In FIG. 2a, the second opening 122 has a circular cross-section. In particular, this is the case even if the axle were arranged to be swivellable with respect to the bushing. Also, the axle 130 can have a circular cross-section. This is not necessarily the case, whereby a bearing whose shape is fitted to the shape of the axle can be applied in the arrangement.

The first opening 112 can extend through the frame 110. Alternatively, the first opening 112 can be a blind hole. Advantageously, the depth of the first opening 112 is at least the length $l_b$ of the tubular frame 124 of the bushing 120 (see FIG. 4b).

The above presented bearing arrangement 104 in the actuator 100 of the forest machine 200 represents, first of all, a bearing arrangement 104 that is suitable for use in the actuator of the forest machine, or, on the other hand, an actuator 100 of a forest machine 200, comprising said bearing arrangement 104.

In a bearing arrangement 104, the bushing 120 can be removed in one piece from the first opening 112 of the frame 110. After such a removal, another corresponding bushing can be installed in said first opening 112 after the bushing 120 has been removed from the frame 110 of the actuator 110. When the bushing 120 is removed, said first opening 112 is exposed. The new bushing is fitted to the shape and the size of the exposed opening 112. The new bushing can be installed in the exposed opening 112.

FIGS. 2a and 2b also show a bearing 140. In the case of these figures, the bearing 140 is arranged stationary with respect to the tool 150. The tool is thus swivellable on the bearing 140 and the axle 130, in relation to the frame 110 of the actuator 100. In FIGS. 2a and 2b, said swivelling takes place when the bearing 140 slides in relation to the bushing 120.

The swivelling of the above described kind wears the surface on which the tool 150 is arranged to be swivellable. Without the bushing 120, the bearing 140 would wear the frame 110 of the actuator directly at the corresponding location. In the arrangement shown in FIGS. 2a and 2b, the wearing takes place not only in the bearing 140 but also in the bushing 120, yet not in the frame 110 of the actuator. Because the bushing 120 is replaceable, the actuator 100 is significantly easier to maintain than before.

Also, the material for the bushing 120 can be selected more freely than the material for the frame 110 of the actuator. In an example, the bushing 120 comprises a different material than the frame 110 of the actuator of the forest machine. In an example, the bushing 120 comprises steel. In an example, the bushing 120 comprises wear-resistant steel. The wear-resistant steel can be, for example, hard. The hardness of the wear-resistant steel can be, for example, 180 or more on the Vickers scale (Vickers Hardness). In an example, the bushing 120 comprises steel whose hardness is at least 190 on the Vickers scale. The wear-resistant steel may comprise, for example, carbon (C), silicon (Si), manganese (Mn), chromium (Cr), and molybdenum (Mo). The wear-resistant steel may comprise, for example 1 to 2% chromium (Cr) and 0.2 to 0.3% molybdenum (Mo). The bushing 120 may comprise, for example, austenitic steel. The bushing 120 may comprise, for example, martensitic steel.

For example, the frame of the actuator may comprise weldable material. In an example, the frame 110 of the actuator comprises a material, such as a metal, with a first hardness; and the bushing 120 comprises a material, such as a metal, with a second hardness. In the example, the second hardness is higher than the first hardness.

In addition or alternatively, in some embodiments the frame 110 of the actuator comprises a first material; the bushing comprises a second material; and the wear resistance of the second material is higher than the wear resistance of the first material.

Alternatively or in addition, the bushing 120 may comprise another hard metal, such as titanium. Alternatively or in addition, the bushing 120 may comprise another hard material, such as ceramics. In particular, that surface of the bushing which is in contact with the bearing, for example the surface of a flange 126 of the bushing to be presented further below, may comprise such hard material.

Figure 3B:
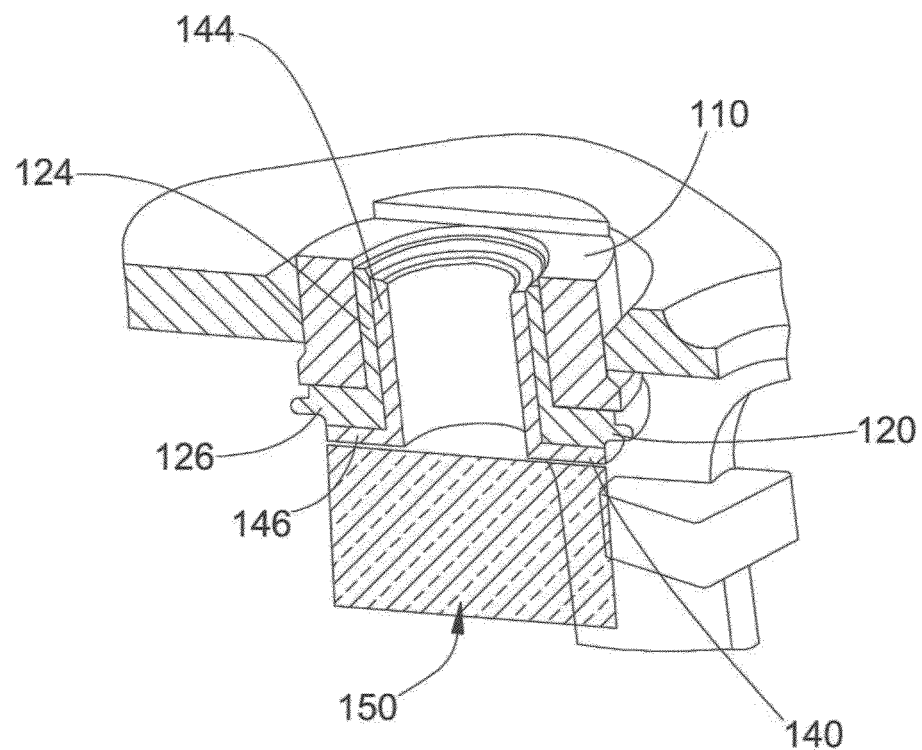
FIG. 3b shows a bearing arrangement in a perspective view.
Figure 4A:
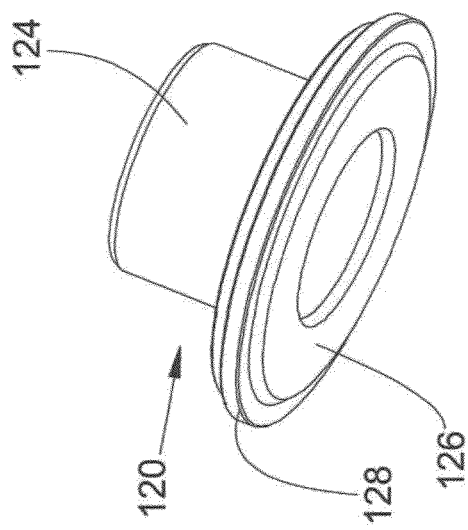
FIG. 4a shows a bushing in a perspective view.
Figure 4B:
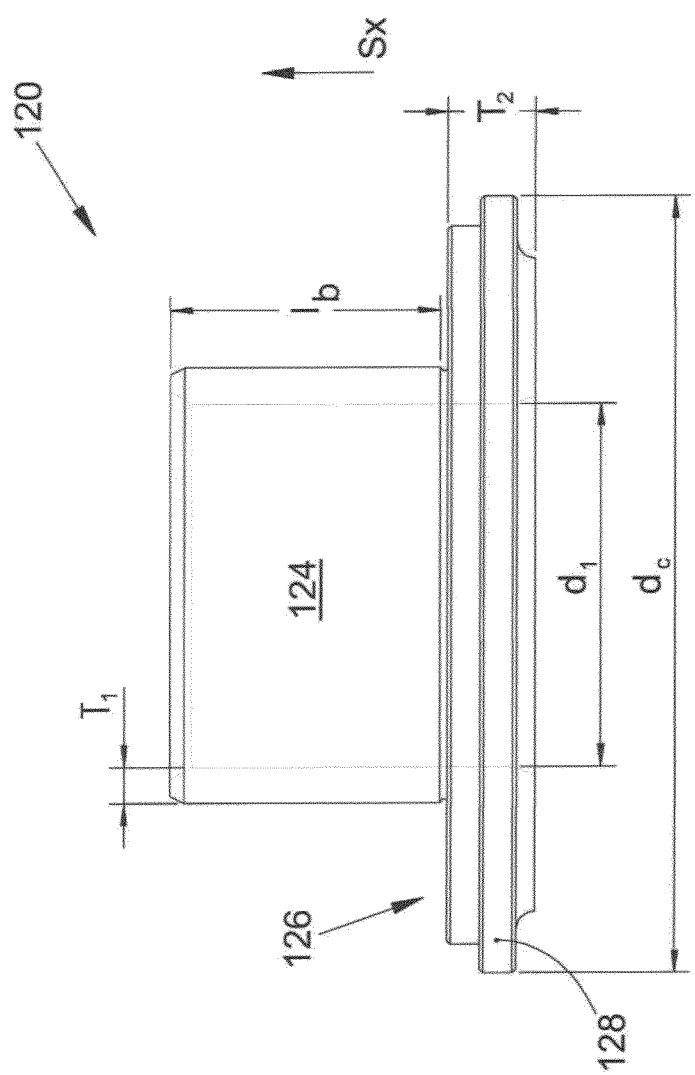
FIG. 4b shows a bushing in a side view.

The bushing 120 is shown in more detail in FIGS. 4a and 4b. With further reference to FIG. 2a, in a bearing arrangement,
a wall 124 of the bushing remains between said axle 130 and said frame 110 of the actuator of the forest machine, and
the thickness $T_1$ of the wall 124 of said bushing (FIG. 4b) is at least 2 mm With reference to FIG. 3b, in a bearing arrangement,
a wall 124 of the bushing remains between said bearing 140 and said frame 110 of the actuator of the forest machine, and
the thickness $T_1$ of the wall 124 of said bushing (FIG. 4b) is at least 2 mm.

Figure 3A:
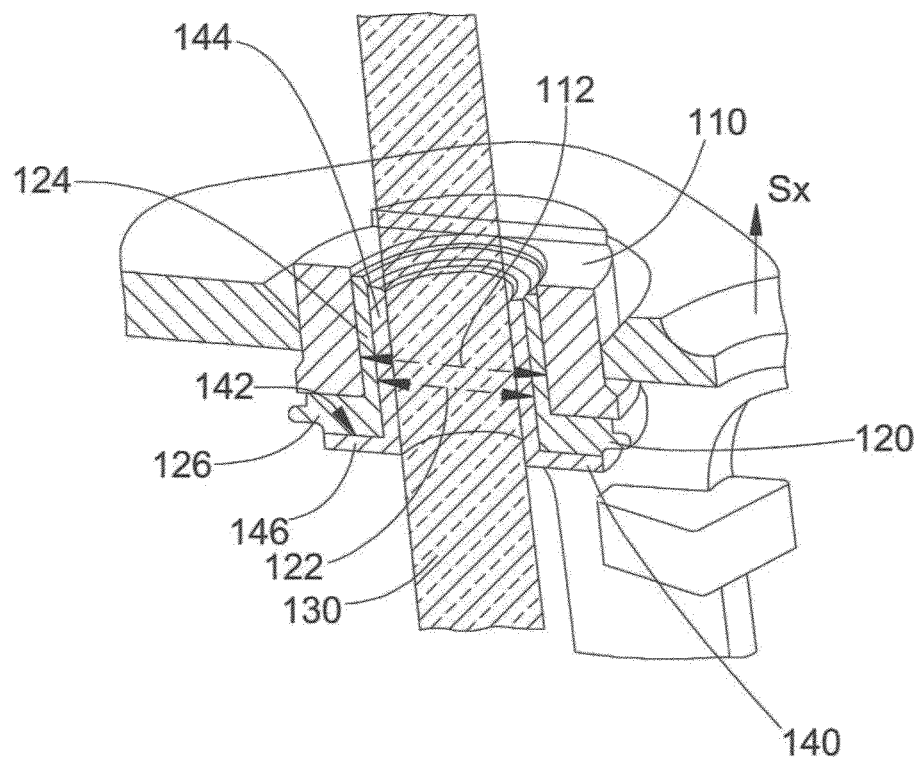
FIG. 3a shows a bearing arrangement in a perspective view.

Said wall 124 can remain between both the axle 130 and the frame 110 and between the bearing 140 and the frame 110 (FIG. 3a).

Such a thickness guarantees that the strength of the bushing is sufficient for actuator applications in a forest machine. In some other examples, the thickness of the wall of the bushing can be, for example, at least 3 mm or at least 4 mm. In some other examples, the thickness of the wall of the bushing can be, for example, not greater than 15 mm or not greater than 8 mm. In an example, the thickness of the wall 124 of the bushing is between 4.5 mm and 5.5 mm, that is, about 5 mm.

Some bearing arrangements 104 comprise an axle 130. With reference to FIGS. 2a and 4b, the inner diameter ($d_1$, FIG. 4b) of the bushing 120 in an example corresponds to the outer diameter ($d_a$, FIG. 2a) of the axle 130. With reference to FIG. 3a, in an example at least part of the bearing 140 also remains between the axle 130 and the bushing 120. The width of the axle 130 should be selected so that the strength requirements for the actuator of the forest machine are met. In this description, the term "width" refers to the largest longitudinal dimension in the cross-section. If the cross-section is circular, i.e. has the shape of a circle, the width is equal to the diameter of said circle.

In an example, the width $d_a$ of the axle 130 (FIG. 2a) is at least 30 mm. In some examples, the width of the axle 130 is at least 40 mm or at least 50 mm. However, the actuator 100 should not be too heavy. In some examples, the width of the axle 130 is not greater than 70 mm, not greater than 80 mm or not greater than 100 mm. In an example, the width of the axle is between 40 mm and 60 mm.

The bushing 120 should be arranged sufficiently deep in the frame 110 of the actuator so that the bushing 120 is resistant to torsional forces as well. For this reason, the walls of the bushing 120 should be sufficiently long. With reference to FIGS. 4b and 2a, in a bearing arrangement,
a wall 124 of the bushing remains between said axle 130 and said frame 110 of the actuator of the forest machine, and
the length $l_b$ of the wall 124 of the bushing in the longitudinal direction of the axle 130 (FIG. 4b) is at least 75% of the width $d_a$ (FIG. 4b), such as the diameter, of the axle.

The ratio between the length $l_b$ of the wall of the bushing and the width $d_a$ of the axle, $l_b/d_a$, can be, for example, between 0.75 and 2, between 0.8 and 1.5, or about 1, such as 0.9 to 1.2. Also in these examples, the width of the axle 130 may vary within the above described ranges. The length $l_b$ of the wall 124 of the bushing in the direction of the axle 130 (FIG. 4b) can be, for example, between 30 mm and 100 mm, such as about 40 mm, about 50 mm or about 60 mm, these figures being given at the accuracy of one digit only.

In an embodiment, the width $d_a$ of the axle is fitted to the width $d_1$ of the second opening 122. This is illustrated, for example, in FIG. 2a. In another embodiment, the width $d_1$ of the second opening 122 is larger by the thickness of the walls of the frame 144 of the bearing 140 than the width $d_a$ of the axle 130. This is illustrated, for example, in FIG. 3a.

The embodiment of FIG. 3b does not comprise a separate axle 130, but the axle 130 consists of the frame 144 of the bearing 140. In this case, as well as in the above mentioned cases, the above mentioned dimensions can be alternatively proportioned to the diameter $d_1$ of the second opening 122 of the bushing 120. Thus, the length $l_b$ of the wall 124 of the bushing in the direction of the axle 130 (FIG. 4b) is at least 75% of the width $d_1$, such as the diameter, of the second opening 122 of the bushing 120 (FIG. 4b). The ratio between the length $l_b$ of the wall of the bushing and the diameter $d_1$ of the second opening 122, $l_b/d_1$, can be, for example, between 0.75 and 2, between 0.8 and 1.5, or about 1, such as 0.9 to 1.2.

With reference to FIG. 4b, in an advantageous embodiment the bushing 120 comprises
a tubular frame 124, whose shape defines the direction Sx of the longitudinal axis of the bushing 120, and
a flange 126 which protrudes from the frame 124 of the bushing, at its one end in the direction of the longitudinal axis, radially and perpendicularly to the direction Sx of the longitudinal axis of the bushing.

Thus, the bushing 120 and its flange 126 are configured to sustain forces in the direction of the longitudinal axis of the bushing. Thus, the bushing 120 and its flange 126 are configured to sustain forces in the direction of the longitudinal axis of the axle 130.

With reference to FIGS. 2a and 3a as well as the above described swivelling of the tool 150 with respect to the bushing 120, the flange 126 of the bushing forms a considerably larger surface than the end of a bushing without a flange 126. Thus, the surface pressure exerted on the flange 126 is significantly lower than the pressure which would be exerted on the bushing without the flange. In FIG. 4b, the outer diameter of the flange is indicated with the symbol $d_c$ and the diameter of the opening of the bushing with the symbol $d_1$. Thus, the width of the flange 126 is $(d_c-d_1)/2$. The ratio between the width of the flange and the thickness of the wall of the bushing, $(d_c-d_1)/(2 \times T_1)$, is in some examples between 2 and 20, between 3 and 15, or between 4 and 10. Such dimensions are used to secure a sufficient reduction in the surface pressure between the bushing 120 and the bearing 140.

Furthermore, the flange 126 may be configured to carry relatively high forces in the direction of the axle 130 (almost) without bending. Thus, the flange is rigid. This gives the advantage that the wear of the bearing 140, corresponding to the flange, is relatively even. In practice, a thin flange might bend, whereby the wear of the corresponding bearing would be significantly more intense in the vicinity of the axle than at the outer edge of the flange 126. In an example,
- the frame 124 of the bushing 120 has a first thickness $T_1$,
- the flange 126 of the bushing 120 has a second thickness $T_2$, and
- the second thickness $T_2$ is at least one and a half times the first thickness $T_1$.

In some examples, the ratio $T_2/T_1$ is between 1.5 and 5, or between 2 and 4, or between 2.2 and 3.

With reference to FIGS. 2a, 2b, 3a, and 3b, some bearing arrangements 104 comprise a bearing 140. The bearing 140 refers to an element which is configured to be swivellable or rotatable with respect to the bushing 120. The bearing 140 may comprise an antifriction bearing or elements of an antifriction bearing, such as balls or rollers. As mentioned above, the bearing 140 is advantageously of a sliding bearing type. The sliding bearing comprises a surface that is configured slidable. The surface arranged to be slidable may comprise, for example, bronze. The bearing 140 may thus comprise bronze. The bearing 140 may be made of bronze. The surface arranged to be slidable may comprise, for example, ceramics. The bearing 140 may thus comprise ceramics. The bearing 140 may be made of ceramics.

In an embodiment (not shown in the figures), the bearing 140 comprises
- a tubular frame 144 which defines the longitudinal direction of the bearing, wherein
- the end of the frame 144 of the bearing constitutes the motion surface 142 of the bearing.

In this context, the motion surface 142 refers to the surface of the bearing 140 that is arranged to move, such as to slide, in relation to the bushing 120. In FIGS. 2b and 3, the motion surface is formed on the flange 146 of the bearing 140, but in some other embodiments the end of the tubular bearing may act as the motion surface 142.

Furthermore, in the bearing arrangement 104 shown in FIGS. 2a, 2b and 3a,
- the bearing arrangement comprises an axle 130, and
- said axle 130 is arranged through the frame of the bearing 140 in said longitudinal direction of the bearing.

With reference to the FIGS. 2a and 2b, in a bearing arrangement 104
- the frame 144 of the bearing 140 extends in a first direction −Sx from the motion surface 142 of the bearing 140,
- the bearing 140 is in contact with the bushing 120, and
- the bushing 120 extends in a second direction +Sx from the point of contact between the bearing 140 and the bushing 120,
- the second direction +Sx being opposite to the first direction −Sx.

The directions +Sx and −Sx refer, for example, to the upper bearing 140 shown in FIG. 2b. In the lower bearing 140b, the directions are the opposite. With reference to the FIGS. 2b and 4b, the above-mentioned second direction +Sx is the same as the previously mentioned direction Sx of the longitudinal axis of the bushing 120. In particular, if the bearing did not comprise a flange, the bearing 140 and the bushing 120 could extend in opposite directions in the above described way.

As stated above, for reasons of weight and size, sliding bearings are preferably used in an actuator of a forest machine. Thus, the sliding bearing is constituted by the bushing 120 and the motion surface 142 of the bearing.

In some embodiments, the bearing 140 comprises a flange 146. In an embodiment of the bearing arrangement 104,
- the bearing 140 comprises a flange 146 which protrudes from the frame 142 of the bearing, at its one end, radially and perpendicularly to the longitudinal direction of the bearing, in which case
- the flange 146 of the bearing comprises a first surface and an opposite second surface, and
- said first or second surface of the flange 146 of the bearing constitutes the motion surface 142 of the bearing.

FIGS. 2a, 3a and 3b illustrate bearing arrangements which comprise a bearing 140 comprising a flange 146. Also, a bearing 140 with a flange can be arranged movable with respect to the bushing 120 in the way presented above and in FIG. 2a. Thus,
- the motion surface 142 of the bearing 140 is formed on the end surface of the flange 146 of the bearing, whereby the frame 144 of the bearing extends in a first direction −Sx from the motion surface 142 of the bearing, the first direction −Sx being, seen from the motion surface 142 of the bearing, the same direction in which the surface of the flange of the bearing opposite to the end surface (in this case, the motion surface) is located,
- the motion surface 142 of the bearing is in contact with the bushing 120, and
- the bushing 120 extends in a second direction +Sx from the point of contact between the bearing 140 and the bushing 120,
- the second direction +Sx being opposite to the first direction −Sx.

The directions +Sx and −Sx refer, for example, to the upper bearing 140 shown in FIG. 2b. In the lower bearing, the directions are the opposite.

In this embodiment, as well as in the previously described embodiment comprising a bearing without a flange, the axle 130 is configured to be stationary with respect to the bushing 120. Thus, in normal use, the axle 130 is not movable in relation to the bushing 120. The bearing 140 is arranged swivellable with respect to the axle. The tool 150 of the actuator 100 can be fastened to the bearing 140 or the frame 110. The frame 110, in turn, is fastened to the bushing 120, as described above.

In this embodiment, as also in the previously described embodiment comprising a bearing without a flange, the contact between the bearing 140 and the bushing 120 sustains particularly forces which are parallel to the axle 130. The bearing 140 can be, for example, supported to the bushing 120, when the bearing is subjected to a force having a component in the second direction +Sx. The bearing arrangement can also comprise a second bushing 120b and a second bearing 140b, as shown in FIG. 2b. The second bearing 140b can be supported to the second bushing 120b, when the second bearing 140b is subjected to a force having a component in the first direction −Sx. In FIG. 2b, the first direction −Sx is opposite to the second direction Sx. In this way, by means of the two bearings (140, 140b), it is possible to prevent the movement of the tool 150 in the direction of the axle. In a corresponding way, by means of the two bushings (120, 120b), it is possible to facilitate the maintenance of the actuator in two parts. In this embodiment, only the axle 130 is arranged in the above mentioned second opening 122.

Alternatively, the bearing 140 and the bushing 120 can be arranged in the way shown in FIG. 3a or 3b with respect to each other. In the bearing arrangement according to this embodiment, the motion surface 142 of the bearing and the frame 144 of the bearing are oriented in the same direction with respect to the end surface of the flange 146 of the bearing (indicated with the direction Sx in FIG. 3a), the motion surface 142 of the bearing is in contact with the bushing 120, and at last part of the frame 144 of the bearing 140 is arranged in the second opening 122 limited by the frame 124 of the bushing 120.

In this embodiment, the axle 130 is arranged movable, i.e. swivellable or rotatable, with respect to the bushing 120. In this embodiment, the axle 130 is arranged stationary with respect to the bearing 140 in such a way that in normal use, the bearing 140 does not move in relation to the axle 130. The tool 150 of the actuator 100 can be fastened to the bearing 140 or the frame 110. The frame 110, in turn, is fastened to the bushing 120, as described above.

In this embodiment, the contact between the bearing 140 and the bushing 120 sustains not only forces parallel to the axle 130 but also forces perpendicular to the longitudinal direction of the axle 130. On the basis of FIGS. 3a and 3b, it is obvious that the bearing 140 is supported to the bushing 120 when the bearing 140 is subjected to a force having a component perpendicular to the direction of the axle. Furthermore, in FIGS. 3a and 3b, the bearing 140 is supported to the bushing 120 when the bearing is subjected to a force having a component in the direction +Sx. The bearing arrangement can also comprise a second bushing 120b and a second bearing 140b, in a way corresponding to that shown in FIG. 2b. In this way, by means of the two bearings (140, 140b), it is possible to prevent the movement of the tool 150 in the direction of the axle. In a corresponding way, by means of the two bushings (120, 120b), it is possible to facilitate the maintenance of the actuator in two parts.

In this embodiment, not only the axle 130 but also at least part of the bearing 140 is arranged in the above mentioned second opening 122.

With reference to FIG. 2b, a bearing arrangement 104 comprises a frame 110 of an actuator of a forest machine, delimiting a first opening 112, a second first opening delimited by said frame 110 or another frame; advantageously, said other frame is mounted on said frame 110 of the actuator of the forest machine for reinforcing the structure, a first bushing 120, at least part of which is arranged in the first opening 112, the first bushing 120 delimiting a second opening 122, in which is arranged at least part of an axle 130 and/or a bearing 140, the axle 130 or bearing 140 being arranged stationary or movable in relation to the bushing, and the first bushing 120 being removable from the frame of the actuator of the forest machine, and also a second bushing 120b, at least part of which being arranged in said second first opening.

The second bushing 120b delimits another second opening. At least part of said axle 130 can be arranged in said another second opening. Alternatively or in addition, at least part of the second bearing 140b can be arranged in said another second opening.

Advantageously, the first bushing 120 comprises a flange 126. Advantageously, the second bushing 120b also comprises a flange. Thus, the bushings 120, 120b can be arranged in such a way that the first bushing 120 comprises a frame 124 and a flange 126 in such a way that the frame 124 extends in a direction +Sx from the flange 126, the second bushing 120b comprises a frame and a flange in such a way that the frame extends in a second direction −Sx from the flange, and the second direction is opposite to the first direction.

Such an arrangement can also comprise a bearing 140 and a second bearing 140b. At least one, advantageously both, of said bearings can comprise a flange, as illustrated in FIG. 2b.

In the above described embodiments, the bushing 120 does not necessarily comprise a flange 126. The bearing 140 can swivel and be supported directly to an end of the frame 140 of bushing, if the bushing 120 does not comprise a flange 126. As stated above, the motion surface 142 of the bearing and the bushing 120 advantageously constitute a sliding bearing.

For the above mentioned reasons, the flange 126 is advantageous in the bushing 120 as well. In such an embodiment, the bushing 120 comprises a tubular frame 124 whose shape defines the direction Sx of the longitudinal axis of the bushing, and a flange 126 which protrudes from the frame 124 of the bushing, at its one end, radially and perpendicularly to the direction Sx of the longitudinal axis of the bushing 120, wherein the flange 126 of the bushing 120 comprises an end surface and another opposite surface.

Furthermore, in this embodiment, said motion surface 142 of the bearing 140 is arranged in contact with the end surface of the flange 126 of the bushing. In this context, the end surface refers to that surface of the flange 126 of the bushing, seen from which the second surface of the flange 126 of the bushing and the frame 124 are left on the same side.

As stated above, for reasons of weight and size, sliding bearings are preferably used in an actuator of a forest machine. Thus, the motion surface 142 of the bearing and the flange 126 of the bushing constitute the sliding bearing.

In general, the operation of bearings is secured by sufficient lubrication. In some embodiments, the bearing arrangement comprises means for applying a lubricant, such as oil or grease, between the bearing 140 and the bushing 120, particularly between the motion surface 142 of the bearing and the bushing 120.

For example in FIG. 2a, the axle 130, the tool 150 and the bearing 140 constitute a channel 170, along which a lubricant, such as oil or grease, can be introduced between the bearing 140 and the bushing 120. Thus, the axle 130 of FIG. 2a comprises at least part of the channel 170. Thus, part of the axle 130 of FIG. 2a constitutes a pipe for introducing lubricant.

The lubricant not only lubricates the bearing arrangement but also prevents the entry of impurities between the bearing 140 and the bushing 120 Impurities increase the wear of the bearing arrangement. Thus, the lubrication reduces the wear of the bearing arrangement, i.e. reduces the need for maintenance.

In addition or alternatively, the entry of impurities between the bearing 140 and the bushing 120 can be reduced by means of a shield 180. A location for the shield 180 in the bearing arrangement is shown in FIG. 2a. In FIG. 2a, the bushing 120 of the bearing arrangement comprises a tubular frame 124 whose shape defines the longitudinal direction Sx of the bushing, and a flange 126, which protrudes from the frame 124 of the bushing, at its one end, radially and perpendicularly to the longitudinal direction Sx of the bushing.

Furthermore, the bearing arrangement comprises a shield 180, which is attached to the flange 126 of the bushing, the shield 180 encircling the flange 126 of the bushing.

The shield 180 protects the bearing arrangement 104, particularly the bushing 120, from impurities and mechanical impacts. Advantageously, the shield 180 encircles closely the flange 126 of the bushing.

This solution provides an advantage in view of manufacturing technology. That is to say, the alignment of the first opening 112 of the frame 110 is not very accurate in this solution. If the shield were fastened to the frame 110, the first opening 112 of the frame 110 should be aligned very accurately in the correct position, so that the shield could be installed in the frame in such a way that the shield would protect the bushing 120 and possibly the bearing 140.

In the above presented solution, in which the shield 180 is fastened particularly to the flange 126 of the bushing 120, there is no such problem of alignment. Completely irrespective of the way in which the first opening 112 is placed in the frame 110, the shield can be connected to the flange 126 of the bushing in such a way that the shield is placed tightly around the bushing 120.

With reference to FIG. 4b, in an embodiment, the flange 126 of the bushing comprises a collar 128. By means of the collar 128, the shield 180 can be fastened to the flange 126. With reference to FIG. 5b, the shield can comprise for example a groove 183 corresponding to the collar 128. Thus, the shape of the shield 180 is fitted to the shape of the flange 126 of the bushing.

The primary function of the shield is to prevent contamination. Thus, the shield 180 does not need to be made of a particularly strong material. The shield may comprise, for example, at least one of the following: plastic and metal. A suitable material can be selected on the basis of, for example, costs.

Figure 5A:
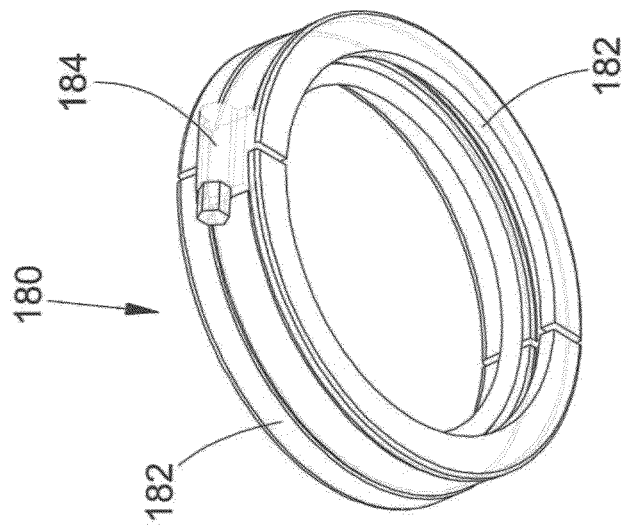
FIG. 5a shows a shield.
Figure 5B:
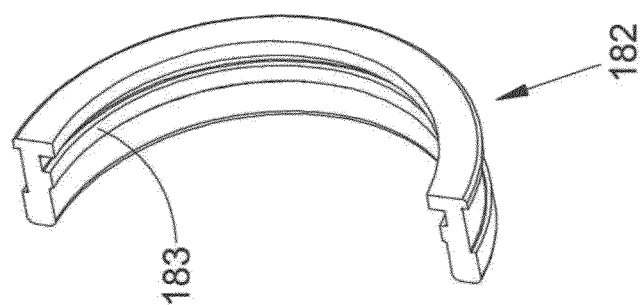
FIG. 5b shows a part of a shield.

FIGS. 5a and 5b illustrate an embodiment of the shield 180. Advantageously, the shield 180 is replaceable. Advantageously, the shield 180 is replaceable in such a way that the rest of the actuator 100 does not need to be particularly disassembled. In an advantageous embodiment, some parts 182 of the shield 180 can be removed from the bearing arrangement 104 in a direction that is perpendicular to the longitudinal direction of the axle 130. However, an axle 130 is not included in all embodiments, whereby some parts 182 of the shield 180 can be removed from the bearing arrangement 104 in a direction that is perpendicular to the longitudinal direction (Sx, FIG. 4b) of the bushing 120. In this embodiment, the shield 180 (FIG. 5a) comprises at least two open parts 182 (FIG. 5b) of the shield removably connected to each other, wherein said at least two parts 182 of the shield 180 are removable from the bearing arrangement 104 in a direction perpendicular to the longitudinal direction of said bushing 120.

The shield 180 of FIG. 5a, and some of the presented bearing arrangements 104, also comprise a clamp 184 for the shield. By means of the clamp 184, the parts 182 of the shield can be clamped to form a uniform shield 180. The clamp 184 is advantageously totally openable, whereby the clamp 184 is also removable from the bearing arrangement 104 in a direction perpendicular to the longitudinal direction of said bushing 120 (or axle 130). It is possible that the clamp can only be opened to such an extent that said at least two parts 182 are replaceable but the clamp 184 is not replaceable without dismantling the actuator.

In an embodiment, the bearing arrangement comprises a bearing 140, which is arranged to be in contact with the flange 126 of the bushing 120, wherein a seam remains between said flange 126 of the bushing and the bearing 140, and said shield 180 also surrounds said seam.

This seam is thus formed between the motion surface 142 of the bearing and the bushing 120. Shielding the seam will contribute to keeping the bearing arrangement clean and thereby reducing the wear and the need for maintenance.

In an embodiment, the bearing arrangement 104 comprises a gasket 160 (FIG. 2a), such as an O ring for sealing said seam.

The gasket 160 contributes to keeping the seam clean.

The above presented solution has several technical advantages:

1) The maintenance operations become easier. Because the bushing 120 is replaceable, the need for maintenance of the frame 110 of the actuator 100, due to wear caused by the bearing, is reduced or eliminated.

2) The maintenance interval increases as a result of the material selections. Because the bushing 120 can be worked more easily and is smaller in size (i.e. in the need for material) than the frame 110 of the actuator, it is possible to use more durable materials in the bearing arrangement in a cost efficient way. Thus, the bushing 120 is worn less than the frame of a corresponding actuator without a bushing would be worn in corresponding use.

3) The maintenance interval increases as a result of lubrication. An embodiment comprises means for introducing oil or grease between the bushing 120 and the bearing 140. This also contributes to the reduction of friction and wear and thereby extends the maintenance interval.

4) The maintenance interval is extended as a result of the shielding. In an embodiment, the shield 180 is arranged to protect the seam between the bushing 120 and the bearing 140 from impurities. Impurities would increase the wear of the structure and the need for maintenance. In an embodiment, the seam is also protected by means of a gasket 160.

5) The quality and/or accuracy required of machining. Because the first opening 112 of the frame 110 is not fitted for the bearing 140 but for the bushing, it is possible to apply less precise tools for machining the first opening, compared with a situation in which a bearing were arranged in the first opening 112. The accuracy requirements are reduced in terms of the size tolerance (for example, the diameter of the first opening) as well as the quality of the work (roughness of the surface of the opening).

6) Alignment accuracy required of machining Because the shield 180 is fastened to the bushing 120 instead of the frame 110, the shield 180 can be placed in just the correct place irrespective of the accuracy of the alignment of the central axis of the first opening 112 in the frame 110.

The presented solution facilitates the maintenance of the actuator 100 significantly. When maintaining an actuator of the presented type for a forest machine, the actuator for the forest machine comprises a frame 110 of the actuator 100 of the forest machine 200, defining a first opening 112, and a bushing 120, at least part of which is arranged in the first opening 112, the bushing 120 defining a second opening 122, in which is arranged at least part of an axle 130, which axle 130 is arranged stationary or movable in relation to the bushing.

In an embodiment of the method, the bushing 120 is replaced with another, new bushing. In the method, a second, corresponding bushing is arranged available, which bushing is fitted for said first opening 112, said bushing 120 is removed from the frame 110 of the actuator of the forest machine, wherein said first opening 112 is exposed, and said second bushing is installed in said exposed first opening 112.

In the figures the reference numerals refer to the following features:
100 Actuator of a forest machine
104 Bearing arrangement, especially in an actuator of a forest machine
110 Frame of an actuator of a forest machine
112 First opening (i.e. opening in frame 110 for bushing 120)
120 (also 120b) Bushing
122 Second opening (i.e. opening in bushing for at least an axle 130)
124 Frame of bushing
126 Flange of bushing
128 Collar of flange of bushing
130 Axle
140 (also 140b) Bearing
142 Motion surface of bearing
144 (also 144b) Frame of bearing
146 (also 146b) Flange of bearing
150 (also 150a, 150b, 150c, 150d, 150e) Tool of actuator 100
152 Blade of tool of actuator
160 Gasket
170 Channel for supplying lubricant
180 Shield
182 Part of shield
183 Groove in shield
184 Clamp for shield
200 Forest machine
210 Base machine
220 Crane
$d_a$ width of axle; diameter of axle with a circular cross-section;
$d_c$ Diameter of flange of bushing
$d_f$ diameter of first opening 112
$l_b$ Length of frame of bushing in the direction of the axle
Sx a direction
−Sx A second direction, opposite to direction Sx
$T_1$ Thickness of wall of frame of bushing
$T_2$ Thickness of flange of bushing Examples of some embodiments 1. A bearing arrangement in an actuator of a forest machine, the bearing arrangement comprising
a frame for the actuator of the forest machine, defining a first opening, the bearing arrangement comprising
a bushing, at least part of the bushing being arranged in the first opening,
the bushing defining a second opening, at least part of an axle and/or a bearing being arranged in the second opening, the axle or bearing being arranged stationary or movable in relation to the bushing, and
the bushing being removable from the frame of the actuator of the forest machine.

2. The bearing arrangement according to Example 1, in which
the bushing is removable in one piece from the first opening of the frame, wherein after the removal of the bushing, a corresponding second bushing can be installed in said first opening.

3. The bearing arrangement according to Example 1 or 2, in which
the bushing comprises a different material than the frame of the actuator of the forest machine,
the bushing comprises steel, or
the frame of the actuator comprises a material, such as a metal, with a first hardness; the bushing comprises a material, such as a metal, with a second hardness; and the second hardness is greater than the first hardness.

4. The bearing arrangement according to any of the Examples 1 to 3, in which
a wall of the bushing is left between said axle and said frame of the actuator of the forest machine, and/or a wall of the bushing is left between said bearing and said frame of the actuator of the forest machine; and
the thickness of said wall of the bushing is at least 2 mm 5. The bearing arrangement according to any of the Examples 1 to 4,
the bearing arrangement comprising an axle, and
the width of said axle being at least 30 mm.

6. The bearing arrangement according to any of the Examples 1 to 5, in which
a wall of the bushing is left between said axle and said frame of the actuator of the forest machine, and/or a wall of the bushing is left between said bearing and said frame of the actuator of the forest machine; and
the length of the wall of the bushing in the direction of the axle is at least 75% of the width of the second opening of the bushing.

7. The bearing arrangement according to any of the Examples 1 to 6, in which
the bushing comprises
a tubular frame whose shape defines the longitudinal direction of the bushing, and
a flange protruding from the frame of the bushing, at its one end, radially and perpendicularly to the longitudinal direction of the bushing,
wherein the bushing and its flange are arranged to sustain forces in the longitudinal direction of the bushing.

8. The bearing arrangement according to Example 7, in which
the frame of the bushing has a first thickness,
the flange of the bushing has a second thickness, and
the second thickness is at least one and a half times the first thickness.

9. The bearing arrangement according to any of the Examples 1 to 8, comprising
an axle and
a bearing which comprises
a tubular frame which defines the longitudinal direction of the bearing, wherein
the end of the frame of the bearing forms a motion surface of the bearing; and
said axle is arranged through the frame of the bearing in said longitudinal direction of the bearing.

10. The bearing arrangement according to Example 9, in which
the frame of the bearing extends in a first direction from the motion surface of the bearing, the bearing is in contact with the bushing, and
the bushing extends in a second direction from the point of contact between the bearing and the bushing,
the second direction being opposite to the first direction.

11. The bearing arrangement according to Example 9, in which
the bearing comprises a flange protruding from the frame of the bearing, at its one end, radially and perpendicularly to the longitudinal direction of the bearing, wherein
the flange of the bearing comprises a first surface and an opposite second surface, and
said first or second surface of the flange of the bearing forms a motion surface of the bearing.

12. The bearing arrangement according to Example 11, in which
(a)
a motion surface of the bearing is formed on the end surface of the flange of the bearing, wherein the frame of the bearing extends in a first direction from the motion surface of the bearing, the first direction being, seen from the motion surface of the bearing, the same direction in which the surface of the flange of the bearing opposite to the end surface is located;
the motion surface of the bearing is in contact with the bushing, and
the bushing extends in a second direction from the point of contact between the bearing and the bushing,
the second direction being opposite to the first direction, or
(b)
a motion surface of the bearing and the frame of the bearing are oriented in the same direction, seen from the end surface of the flange of the bearing,
the motion surface of the bearing is in contact with the bushing, and
at least a part of the frame of the bearing is arranged in the second opening delimited by the frame of the bushing.

13. The bearing arrangement according to any of the Examples 9 to 12, wherein
the bushing comprises
a tubular frame whose shape defines the longitudinal direction of the bushing, and
a flange protruding from the frame of the bushing, at its one end, radially and perpendicularly to the longitudinal direction of the bushing, wherein
the flange of the bushing comprises an end surface and another opposite surface,
said motion surface of the bearing is arranged in contact with the end surface of the flange of the bushing.

14. The bearing arrangement according to Example 13, in which
a motion surface of the bearing and the flange of the bushing constitute a sliding bearing.

15. The bearing arrangement according to any of the Examples 9 to 14, comprising
means for applying a lubricant, such as oil or grease, between the motion surface of the bearing and the bushing.

16. The bearing arrangement according to any of the Examples 1 to 15, wherein
the bushing comprises
a tubular frame whose shape defines the longitudinal direction of the bushing, and
a flange protruding from the frame of the bushing, at its one end, radially and perpendicularly to the longitudinal direction of the bushing; and the bearing arrangement comprises
a shield which is attached to the flange of the bushing, and which
shield encircles the flange of the bushing.

17. The bearing arrangement according to Example 16, in which
the shield comprises at least two open parts removably connected to each other, wherein said at least two parts of the shield are removable from the bearing arrangement in a direction perpendicular to the longitudinal direction of said bushing.

18. The bearing arrangement according to Example 16 or 17, comprising
a bearing arranged in contact with the flange of the bushing, wherein
a seam is left between said flange of the bushing and the bearing, and
said shield also surrounds said seam.

19. The bearing arrangement according to Example 18, comprising
a gasket, such as an O ring, for sealing said seam.

20. A method for maintaining an actuator of a forest machine, in which method the actuator of the forest machine comprises
a frame of the actuator of the forest machine, the frame delimiting a first opening, and
a bushing, at least part of the bushing being arranged in the first opening,
the bushing delimiting a second opening, at least part of an axle and/or a bearing being arranged in the second opening, said axle or bearing being arranged stationary or movable in relation to the bushing, and the method comprising
arranging a second, corresponding bushing available, which bushing is fitted for said first opening,
removing said bushing from the frame of the actuator of the forest machine, wherein said first opening is exposed, and
installing said second bushing in said first opening.

The invention claimed is:
1. A bearing arrangement in an actuator of a forest machine, the bearing arrangement comprising:
a bearing comprising a tubular frame which defines a longitudinal direction of the bearing;
an axle arranged through the frame of the bearing in said longitudinal direction of the bearing;
a frame of the actuator of the forest machine, the frame of the actuator delimiting a first opening; and
a bushing, at least part of the bushing being arranged in the first opening, the bushing delimiting a second opening, at least part of the axle and/or the bearing being arranged in the second opening, the axle or bearing being arranged stationary or movable in relation to the bushing, the bushing comprising:
a tubular frame whose shape defines the longitudinal direction of the bushing; and
a flange protruding from the frame of the hushing, at an end, radially and perpendicularly to the longitudinal direction of the bushing, the flange comprising an end surface and another opposite surface;
wherein the bushing is removable from the frame of the actuator, an end of the frame of the bearing constitutes a motion surface of the bearing, and the motion surface is arranged in contact with the end surface of the flange of the bushing.

2. The bearing arrangement of claim 1, wherein the bushing is removable in one piece from the first opening of the frame of the actuator, wherein after the removal of the bushing, a corresponding second bushing is installable in said first opening.

3. The bearing arrangement of claim 1, wherein the frame of the actuator comprises a material with a first hardness, the bushing comprises a material with a second hardness, and the second hardness is greater than the first hardness.

4. The bearing arrangement of claim 1, wherein the bushing comprises a wall, the wall is positioned between the axle and the frame of the actuator, and the thickness of the wall is at least 2 mm.

5. The bearing arrangement of claim 1, wherein the width of said axle is at least 30 mm.

6. The bearing arrangement of claim 1, wherein:
said bushing comprises a wall positioned between said axle and said frame of the actuator; and
the length of said wall of the bushing in the direction of the axle is at least 75% of the width of the second opening.

7. The bearing arrangement of claim 1, wherein:
the bushing comprises:
a tubular frame whose shape defines a longitudinal direction of the bushing; and
a flange protruding from the frame of the bushing at an end, radially and perpendicularly to the longitudinal direction of the bushing;
wherein said bushing and said flange are arranged to sustain forces in the longitudinal direction of the bushing.

8. The bearing arrangement of claim 7, wherein:
the frame of the bushing has a first thickness;
the flange of the bushing has a second thickness; and
the second thickness is at least one and a half times the first thickness.

9. The bearing arrangement of claim 1, wherein:
the frame of the bearing extends in a first direction from the motion surface of the bearing;
the bearing is in contact with the bushing;
the bushing extends in a second direction from a point of contact between the bearing and the bushing; and
the second direction being opposite to the first direction.

10. The bearing arrangement of claim 1, wherein:
the bearing comprises a flange protruding from the frame of the bearing, at an end, radially and perpendicularly to the longitudinal direction of the bearing, wherein:
the flange of the bearing comprises a first surface and an opposite second surface; and
said first or second surface of the flange of the bearing forms the motion surface of the bearing.

11. The bearing arrangement of claim 10, wherein:
the motion surface of the bearing is formed on an end surface of the flange of the bearing, wherein the frame of the bearing extends in a first direction from the motion surface of the bearing, the first direction being, seen from the motion surface of the bearing, the same direction in which a surface of the flange of the bearing opposite to the end surface is located.

12. The bearing arrangement of claim 10, wherein:
the motion surface of the bearing and the frame of the bearing are oriented in the same direction, seen from the end surface of the flange of the bearing;
the motion surface of the bearing is in contact with the bushing; and
at least a part of the frame of the bearing is arranged in the second opening.

13. The bearing arrangement of claim 1, wherein said motion surface of the bearing and the flange of the bushing constitute a sliding bearing.

14. The bearing arrangement of claim 1, comprising means for applying a lubricant between said motion surface of the bearing and the bushing.

15. The bearing arrangement of claim 1, further comprising:
a tubular frame included in the bushing, the shape of the frame of the bushing defining the longitudinal direction of the bushing;
a flange included in the bushing, the flange of the bushing protruding from the frame of the bushing, at an end, radially and perpendicularly to the longitudinal direction of the bushing;
a shield attached to the flange of the bushing and encircling the flange of the bushing.

16. The bearing arrangement of claim 15, wherein the shield comprises at least two open parts removably connected to each other, said at least two parts of the shield removable from the bearing arrangement in a direction perpendicular to the longitudinal direction of said bushing.

17. The bearing arrangement of claim 15, wherein:
the bearing is arranged in contact with the flange of the bushing;
a seam is left between said flange of the bushing and the bearing; and
said shield surrounds said seam.

18. The bearing arrangement of claim 17, further comprising a gasket for sealing said seam.

* * * * *